Patented Apr. 12, 1949

2,466,889

UNITED STATES PATENT OFFICE 2,466,889

ALCOHOL-SOLUBLE PHENOL-MODIFIED COUMARONE-INDENE RESIN

Lyle M. Geiger, Edgewood, Pa., assignor to The Neville Company, Pittsburgh, Pa., a corporation of Pennsylvania No Drawing. Application August 18, 1945, Serial No. 611,447

5 Claims. (Cl. 260—81)

This invention relates to the production of alcohol soluble phenol-modified resins from the polymerizable constituents of crude solvent naphtha.

As is well known in the art, crude solvent naphtha contains substantial proportions of polymerizable substances, largely coumarone and indene, which may be converted into resinous polymers by various means well known in the art. It is likewise known that the polymers resultant from simple thermal or catalytic polymerization are insoluble in alcohols. The property of alcohol solubility is desirable, however, because it extends the field of utility of such coumarone-indene resins, and various means have been proposed for rendering alcohol soluble, by means of a chemical modification, the polymerized constituents of crude solvent naphtha.

For example, U. S. Patent No. 2,077,009, owned by the assignee of the present application, describes a process of producing such alcohol soluble polymers by the interaction of the polymerizable constituents of crude solvent naphtha and a phenolic substance under the catalytic action of activated clay. The resins produced according to that method are soft but they may be separated, as by steam distillation, into a hard resin and a viscous resinous oil, known as heavy oil. Although extended experience has shown that the method is satisfactorily operable, it is generally true that the yield of the resinous oil, which consists of a condensation product of 1 mol of coumarone or indene, with 1 mol of a phenol, is high relative to the yield of hard resin. High yields of heavy oil are objectionable because the hard resin, which is composed of polymerized coumarone or indene condensed with a phenol, is more valuable industrially than the resinous oil. It has likewise been experienced that sometimes the reaction required higher temperatures than at other times, and that is undesirable because the use of higher temperatures tends to render the resin dark colored, and thus less valuable. Again, the degree of alcohol solubility may not always be as great as desired.

In the foregoing patent no attention is paid to the influence of water. U. S. Patent No. 2,160,537, likewise owned by the assignee of the present application constitutes an improvement on the foregoing process. According to it, the water that is present normally in these activated clays blankets their catalytic activity, and in accordance with the invention of this latter patent, the polymerization and condensation step is carried out in such a way that water is positively removed from the reaction body at a controlled rate, preferably during the entire treatment. Experience with that process has shown that it is likewise satisfactorily operable but that, as in the case of No. 2,077,009, the yields of heavy oil are high.

An object of the present invention is to provide an improved method of producing alcohol soluble resins from the polymerizable constituents of crude solvent naphtha, and more particularly a method that consistently gives products of high solubility in alcohol and of desirable color.

A particular object is to provide such a method which gives greater yields of hard resin relative to heavy oil than have been customarily produced by the previously known methods.

Still another object is to provide a method in accordance with the foregoing objects in which the polymerization and condensation may be effected satisfactorily at relatively low temperatures.

Other objects will be recognized from the following specification.

I have discovered, and it is upon this that my invention is in large part predicated, that to attain the objects of the invention, and particularly to obtain high yields of resin and resin of light color, it is imperative that the reactants be initially in anhydrous, or substantially anhydrous, condition, and further that, peculiarly enough, the activated clay used to effect the phenol modifying reaction and resin formation should contain water. This is in contrast to the aforesaid Patent No. 2,160,537, the implication of which is that the best results would be obtained with dry activated clay, and which is predicated upon the removal of water during the reaction, which is unnecessary in practicing the present invention. It is in contrast also to both of the foregoing patents in that neither of them suggests that there would be any advantage in using the phenolic substance and the crude solvent naphtha in anhydrous condition. In fact, inasmuch as activated clay normally contains water, usually from about 5 to about 30 per cent by weight, the normal belief would be that initial treatment of the liquid reactants to remove water carried by them would be pointless.

In the practice of the present invention, therefore, I first treat the crude solvent naphtha with a drying agent to render it substantially anhydrous. The same thing may be done with the phenolic substance, if necessary, and ordinarily it is preferred to mix the crude naphtha and the phenolic substance, and then treat the mixture with a drying agent. The dried liquid is then separated from the drying agent. The anhydrous mixture of naphtha and phenolic substance is then mixed with an amount of wet activated clay. The amount of phenolic substance used will depend upon the particular phenolic substance used and the content and make up of polymerizable constituents of the crude solvent naphtha. Likewise, the amount of activated clay will depend upon similar factors as well as upon the clay itself and its water content. These factors are understood in the prior art, such as the foregoing patents, or are easily determinable in any particular case, and they are illustrated by the examples given hereinafter.

The mixture of dried crude naphtha, phenolic substance and wet activated clay, e. g., of the type that has been used heretofore, is agitated and heated to cause the phenol modifying and polymerizing reactions. Thereafter the activated clay is separated, as by filtration, and the filtrate is treated to recover the polymerized bodies, e. g., by distilling off the residual crude solvent naphtha and any unreacted phenolic substance. The resin residue may then be treated appropriately, if desired, to recover the hard resin separate from the heavy oil, suitably by steam distillation.

For the best results the crude solvent naphtha should first be treated to remove tar bases, which tend to inhibit the reactions. This may be done, for example, by agitating it vigorously with a dilute solution of a mineral acid, such as sulfuric acid, followed by separation of the acid layer from the naphtha, and treatment of the naphtha to remove residues of acid.

In the preferred practice of the invention, therefore, crude solvent naphtha is agitated vigorously with, for example, dilute sulfuric acid which binds the tar bases to form water soluble salts but which, being dilute, does not cause polymerization of the reactive constituents of the naphtha. The aqueous acid layer is then removed by decantation, and the naphtha is then given a plurality of water washes, or a single water wash followed by a wash with dilute aqueous soda ash solution, to remove traces of acid. In this condition the crude solvent naphtha has been freed from reaction-inhibiting tar bases but it contains traces of water which, as I have found, prevent the formation of alcohol soluble phenol-modified resins at lower temperatures. Accordingly, the acid washed crude is mixed with the proper amount of the phenolic substance and the mixture is then treated with a drying agent, preferably at an elevated temperature but for most purposes not over about 90° C., and most advantageously between 60° and 80° C. Thoroughly dried activated clay, such as that sold as "Super Filtrol," may be used for this purpose, although various other well known drying agents may be used such, for example, as anhydrous calcium sulfate (CaSO$_4$), anhydrous sodium sulfate (Na$_2$SO$_4$), anhydrous copper sulfate (CuSO$_4$), and activated charcoal. The mixture with the drying agent is agitated vigorously for a period of time, after which the drying agent is removed by filtration, and the clay catalyst is then added to the purified and anhydrous reaction mixture.

I prefer to use an activated clay containing from about 5 to about 30 per cent of water, an example being that sold as "Super Filtrol." Such a clay carrying water does not cause the simple polymerization of coumarone and indene but it promotes actively the formation of phenol modified polymers thereof. Accordingly, and this is an important feature of the invention, the use of wet clay in a reaction mixture that is initially substantially anhydrous permits the reactions to be carried out at relatively low temperatures, below about 110° C., to produce light colored resins of good alcohol solubility, with high yield of hard resin relative to heavy oil, and without the formation, at least to any substantial extent, of straight coumarone or indene polymers.

The invention may be understood further with reference to the following examples.

*Example No. 1.*—400 gallons of a crude solvent naphtha containing 60 per cent of polymerizable constituents were agitated for four hours with 50 gallons of a 20 per cent by weight solution of sulfuric acid. The acid layer was separated by decantation, and the naphtha then given two washes with 50 gallons of water, and a final wash with 50 gallons of a 7 per cent by weight soda ash (Na$_2$CO$_3$) solution. 100 gallons of commercial cresylic acid were then added and the mixture was agitated during one hour at 55° to 65° C. with 75 pounds of "Super Filtrol" clay that had been thoroughly dried at 180° to 200° C. for thirty-six hours. The clay was then removed by filtration. There were then added 175 pounds of wet "Super Filtrol" clay. This mixture was heated at 80° to 90° C. for eleven hours while agitating it thoroughly. The clay was then removed by filtration. Treatment of the liquid produced 37.4 per cent of a very light colored resin and 9 per cent of a heavy oil, both soluble in alcohols.

*Example No. 2.*—To 225.6 grams of the solvent naphtha purified according to Example No. 1 there were added 62.8 grams of commercial cresylic acid. The mixture was agitated during one-half hour with 7.2 grams of anhydrous calcium sulfate at 55° to 65° C. The calcium sulfate was then removed by filtration and then 14.4 grams of wet "Super Filtrol" clay were added. This mixture was heated for five hours at 80° to 90° C., with agitation. After removal of the clay and working up the liquid residue there were obtained 36.8 per cent of an extremely light colored resin and 9 per cent of a heavy oil, both alcohol soluble.

*Example No. 3.*—To 225.6 grams of the solvent naphtha purified as described in Example No. 1 there were added 62.8 grams of commercial cresylic acid. The mixture was agitated for one-half hour with 7.2 grams of an activated carbon sold as "Nuchar 00," after which the carbon was removed by filtration. There were then added 14.4 grams of wet "Super Filtrol" clay and the mixture was agitated continuously while heating it at 80° to 90° C. during five hours. The final yield was 26.6 per cent of a light colored resin and 9.3 per cent of a heavy oil, both alcohol soluble.

These examples exemplify the results to be had through the practice of the present invention, particularly the consistent production of high yields of hard resins possessing very light color, and relatively low yields of the less valuable heavy oils, with both the hard resins and the heavy oils possessing excellent alcohol solubility.

According to the provisions of the patent statutes, I have explained the principle and mode of practicing my invention, and have described what I now consider to represent its best embodiment. However, I desire to have it understood that, within the scope of the appended claims, the invention may be practiced otherwise than as specifically illustrated and described.

I claim:

1. A method according to claim 5, said drying agent being dry activated clay.

2. In a method of producing alcohol soluble resins by reacting polymerizable constituents of crude solvent naphtha with a phenol capable of condensing with the unsaturates contained in said naphtha, the steps comprising contacting the crude solvent naphtha with a dilute mineral acid and thereby removing reaction-inhibiting tar acids, then separating the treated naphtha from said acid, then mixing the naphtha with said phenol and drying the mixture by contact with a drying agent without effecting polymerization, separating the mixture from said drying agent, and mixing the dried mixture at a temperature not over about 110° C. with activated clay containing from about 5 to 30 percent of water and thereby producing alcohol soluble phenolic-modified resin from said polymerizable constituents.

3. In a method of producing alcohol soluble resins by reacting polymerizable constituents of crude solvent naphtha with a phenol capable of condensing with the unsaturates contained in said naphtha, the steps comprising contacting the crude solvent naphtha with dilute sulfuric acid and thereby removing reaction-inhibiting tar acids, then separating the treated naphtha from said acid, then mixing the naphtha with said phenol and drying the mixture at a temperature below about 90° C. by contact with a drying agent without effecting polymerization, separating the mixture from said drying agent, and mixing the dried mixture at a temperature not over about 110° C. with activated clay containing about 5 to 30 per cent of water and thereby producing alcohol soluble phenolic-modified resin from said polymerizable constituents.

4. In a method of producing alcohol soluble resins by reacting polymerizable constituents of crude solvent naphtha with a phenol capable of condensing with the unsaturates contained in said naphtha, the steps comprising mixing the naphtha with said phenol and drying the mixture at a temperature below about 90° C. by contact with a drying agent without effecting polymerization, separating the mixture from said drying agent, and mixing the dried mixture with activated clay containing about 5 to 30 per cent of water at a temperature not over about 110° C. and thereby producing alcohol soluble phenolic-modified resin from said polymerizable constituents.

5. In a method of producing alcohol soluble resins by reacting polymerizable constituents of crude solvent naphtha with a phenol capable of condensing with the unsaturates contained in said naphtha, the steps comprising mixing the naphtha with said phenol and drying the mixture by contact with a drying agent without effecting polymerization, separating the mixture from said drying agent, and mixing the dried mixture with activated clay containing from about 5 to 30 per cent of water while heating them at a temperature not over 110° C. and thereby producing alcohol soluble phenolic-modified resin from said polymerizable constituents.

LYLE M. GEIGER.

REFERENCES CITED

The following references are of record in the file of this patent:

UNITED STATES PATENTS

| Number | Name | Date |
|---|---|---|
| 2,077,009 | Rivkin | Apr. 13, 1937 |
| 2,160,537 | Carmody | May 30, 1939 |
| 2,345,962 | Cline | Apr. 4, 1944 |